US006119326A

United States Patent [19]
Szweda

[11] Patent Number: 6,119,326

[45] Date of Patent: Sep. 19, 2000

[54] NUMISMATIC COIN HOLDER EXTRACTOR

[76] Inventor: Norbert Marcel Szweda, 10001 Goodall Rd., D16, Durand, Mich. 48429

[21] Appl. No.: 09/414,157

[22] Filed: Oct. 8, 1999

Related U.S. Application Data

[60] Provisional application No. 60/151,334, Aug. 30, 1999.

[51] Int. Cl.[7] .............................. B23P 19/00; B25B 27/00

[52] U.S. Cl. ............................... 29/426.1; 29/278; 294/26

[58] Field of Search .......................... 294/26, 25; 206/81, 206/349; 29/278, 426.1

[56] References Cited

U.S. PATENT DOCUMENTS

| | | | |
|---|---|---|---|
| 1,563,575 | 12/1925 | Jung | 294/26 |
| 2,663,588 | 12/1953 | Scheldorfer | 294/26 |
| 3,284,865 | 11/1966 | Burnham | 294/26 |
| 5,660,099 | 8/1997 | Figueira, Jr. | 294/26 |

*Primary Examiner*—David P. Bryant
*Assistant Examiner*—Marc Jimenez

[57] ABSTRACT

A tool and a method employed by numismatists to extract numismatically valued coins from pockets on vinyl pages used to house and display coin collections. Tools can be machined from either plastic material or sheet steel stock, either material can be machined to identical configurations and are equal to performing desired function. Tool is machined on left segment to form a half circle, right segment is machined to a narrowed extension, on extreme right end of segment a small ridge is formed. Tool is held by placing thumb on inner surface of half circle, opposing forefinger is placed on outer surface of half circle, holding it thusly, narrowed segment is inserted into top opening of pocket, housing numismatically valued coin, engaging small ridge in recessed area of coin holder, drawing tool upward extracts coin holder.

1 Claim, 1 Drawing Sheet

NUMISMATIC COIN HOLDER EXTRACTOR

CROSS REFERENCE TO RELATED APPLICATION

Provisional Patent No. Assigned: 60/151 334 Dated: Aug 30, 1999

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

This invention relates to a tool and a method for extracting numismatic coin holders from pockets on vinyl pages that house and display coin collections.

Removing coin holders from aforementioned pockets, entails bending or flexing vinyl pages and inserting fingers or tweezers through top opening of pockets, to attempt withdrawing holders.

Another method is to push coin holders up through opening at bottom of pocket by inserting a pencil or like instrument, either method could mar coin holders or damage valued coin.

Handling coins excessively when replacing marred or damaged holders is detrimental in numismatics and could decrease value of valuable coins.

It is the objective of the present invention to provide a tool and a method to remove coin holders from pockets without the aforementioned problems.

With foregoing in view and other advantages as will become apparent to those skilled in the art to which this invention relates as this specification proceeds, the invention is herein described by reference to the accompanying drawings forming a part hereof which includes a detailed description of the best mode known to the applicant and of the preferred typical embodiment of the principles of the present invention.

BRIEF SUMMARY OF THE INVENTION

My invention is a tool and a method to extract coin holders from pockets on vinyl pages used to house and display numismatically valued coins, without marring coin holders or damaging valued coins.

DETAILED DESCRIPTION OF THE INVENTION

Figure 1:
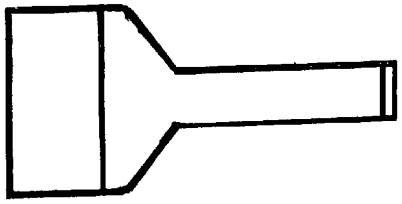
FIG. 1: Top view of Extractor.
Figure 2:
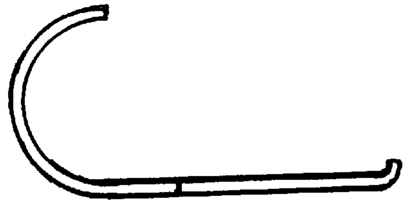
FIG. 2: Side View of Extractor.
Figure 3:
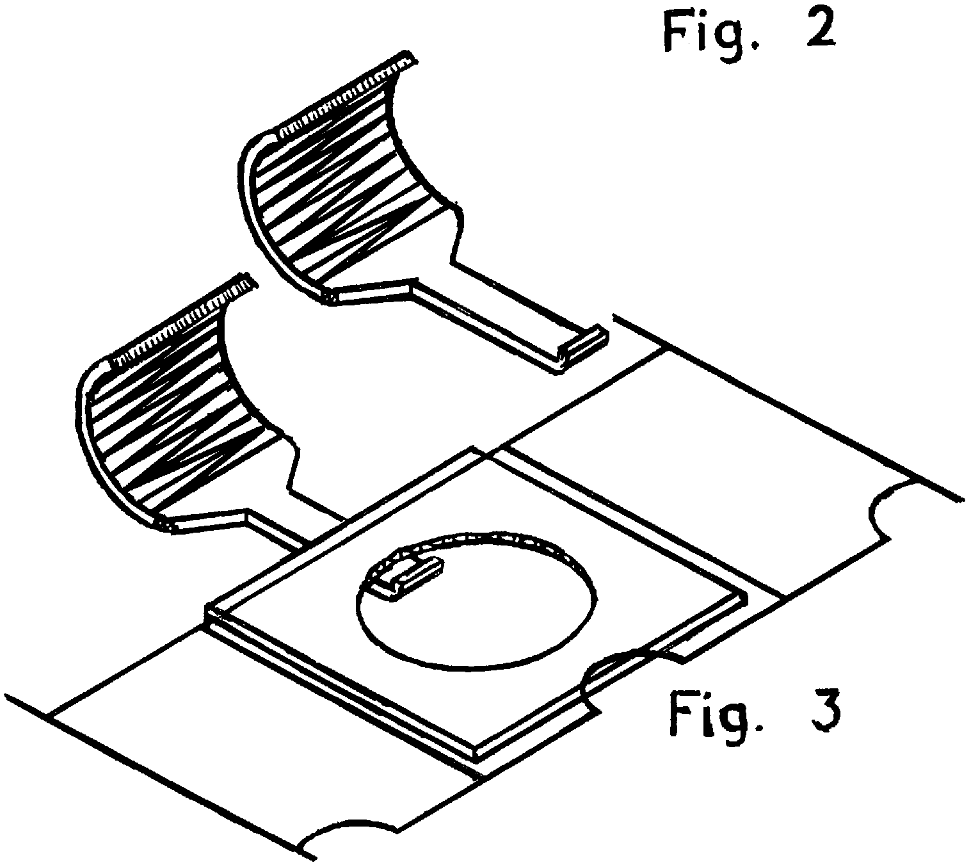
FIG. 3: Extractor shown free standing and shown inserted into top opening of pocket engaging coin holder in recessed area.

A tool and a method to benefit numismatists. Tool is machined from either plastic material or steel sheet stock.

Machining plastic is accomplished by either extrusion or injection molding. Machining with plastic material is cost effective.

Machining steel sheet stock produces a durable tool, using a readily available material. Either material machines to desired configuration and is equal to performing required function.

Left segment of tool is machined upward from a horizontal plane, forming a half circle, right side of half circle is open, inner surface of half circle is knurled, and is only area knurled, knurled area facilitates ease of handling when performing desired function.

Right segment is narrowed on center of the tool, extreme right end of segment is machined upward vertically to accommodate a small ridge, this ridge is instrumental in extracting coin holder.

Method to using tool is to place thumb on inner surface of half circle, and placing opposing forefinger on outer surface of half circle, holding it thusly, narrowed segment is inserted through top opening of aforementioned pocket, engaging ridged area of narrowed segment in recessed area of coin holder, drawing tool upward extracts coin holder.

Since various modifications can be made in my invention, herein described, and many apparently widely different embodiments of same made within the spirit and scope of the claims without departing from such spirit and scope, it is intended that all matters contained in the accompanying specification shall be interpreted as illustrative and not in a limiting sense.

What is claimed is:

1. A method of removing a coin holder from coin holder packets, comprising the steps of:

providing a tool for pulling said coin holder from said coin holder packets, said tool having a first end with an upwardly extending engagment ridge, a horizontal central portion connected to said first end, and a second end with an upwardly extending handle;

holding said second end of said tool with finger;

placing said first end of said tool between said coin holder and said coin holder packet so that said engagment ridge engages said coin holder;

pulling said tool when said engagement ridge engages said coin holder, thereby removing said coin holder from said coin holder packets.

* * * * *